United States Patent [19]

Elehew et al.

[11] 4,348,466

[45] Sep. 7, 1982

[54] ANTI-SPILL DEVICE FOR ELECTROLYTE BATTERY

[75] Inventors: Wolodymyr R. Elehew; Peter T. Kong, both of Scarborough, Canada

[73] Assignee: Varta Batteries Limited, Willowdale, Canada

[21] Appl. No.: 227,511

[22] Filed: Jan. 27, 1981

[51] Int. Cl.³ ............................................. H01M 2/12
[52] U.S. Cl. ........................................ 429/84; 429/88
[58] Field of Search ....................... 429/84, 88, 87, 78, 429/72, 82

[56] References Cited

U.S. PATENT DOCUMENTS

1,605,820 11/1926 Edwards ............................... 429/84
3,597,280 8/1971 Hennen ................................ 429/88

Primary Examiner—Donald L. Walton

[57] ABSTRACT

An anti-spill arrangement is disclosed for a liquid electrolyte battery. The device comprises a chamber configuration or arrangement for containing electrolyte associated with a battery cell, when a battery is tipped toward or onto any one of its sides. The chamber arrangement has an inlet in communication with an associated battery cell and an outlet in communication with a vent to atmosphere. The chamber arrangement is such that regardless to which side a battery having the device is tipped, electrolyte flows from the associated battery cell into the chamber arrangement to a level which blocks further electrolyte flow through the inlet. The chamber arrangement is such that the contained level of electrolyte remains spaced from the outlet of the arrangement. Thus, this type of device precludes flow of electrolyte out of the anti-spill device when the battery is tipped to any one of its sides. The arrangement may be such that, when the battery is righted, the electrolyte is returned to the respective cell to thereby restore electrolyte in that cell to its operating level.

10 Claims, 11 Drawing Figures

ANTI-SPILL DEVICE FOR ELECTROLYTE BATTERY

FIELD OF THE INVENTION

This invention relates to an anti-spill device for liquid electrolyte batteries which is designed to prevent spillage of electrolyte when a battery is tipped to any one of its sides.

BACKGROUND OF THE INVENTION

Various approaches have been taken in the past to deal with the problem of electrolyte spilling or leaking from a battery when it is tipped to any one of its sides or completely turned over. For example, a particular arrangement is disclosed in Canadian Pat. No. 682,389, where a device is located in each electrolyte cell opening which is arranged to preclude liquid electrolyte from flowing out of the cell. This is accomplished by the use of a baffle device which is made of hydrophobic plastic resilient material and spaced from the sidewalls of the opening by no more than 0.3 millimeters. Thus, the baffle device, in view of its hydrophobic nature and the surface tension of the electrolyte, blocks outward flow of electrolyte, yet permits the escape of gases from the battery cell when the battery is upright. Such device is somewhat complex in nature, difficult to manufacture and keep in place in the battery and increases the overall height profile of the battery.

Another arrangement is disclosed in U.S. Pat. No. 2,620,370, where interior of the battery a sufficiently large enclosure is provided above the plates, such that when the battery is tipped to any one of its sides, the electrolyte does not rise to a level over the length of cell and enclosure to reach the opening for the cell vent. This arrangement, however, substantially increases the overall height profile of the battery.

U.S. Pat. No. 3,597,280 discloses a type of multiple vent plug assembly which provides for a plurality of enclosures in communication with one another and in communication with cells of a liquid electrolyte battery. When the battery is tipped to any one of its sides, the enclosures serve to contain electrolyte to a level such that the vent openings are filled with electrolyte and, due to the narrow constricting shape of the vent openings, offer obstruction to the discharge of electrolyte from the cells where the leaked electrolyte is accumulated in the enclosures. This type of arrangements may be acceptable in situations where the battery is tilted to its side and not subjected to vibration or other forms of movement, since the liquid will readily drip from the vent opening should the battery be moved about or vibrated while on its side. Thus the system of U.S. Pat. No. 3,597,280 does not provide a complete anti-spill device for batteries.

Aside from the above arrangements, far more complex arrangements are known which are used on aircraft battery and the like which, not only deal with the problem of electrolyte flowing from the cell when tipped to any one of its sides, but also maintains a battery in operation when completely inverted.

It is, therefore, an object of this invention to provide an anti-spill device for a liquid electrolyte battery which is relatively inexpensive to manufacture, may provide a low overall height profile for the battery and is operable to contain electrolyte and prevent spillage thereof, when a battery is tipped toward or onto any one of its sides. This is most useful in batteries, such as car or motorcycle batteries, where during the handling thereof there may be an accidental tipping of the battery to any one of its sides. It may also be necessary that spillage be prevented for extended periods as the tipped battery has gone unnoticed. A further consideration is that, when the battery is in use, vehicles may be operated on such steep inclines that the battery requires an anti-spill device to prevent electrolyte loss while it is tilted. In righting the battery, a feature of the invention is that it may be adapted to return contained electrolyte to the battery cell from which it came to thereby restore it to its normal operating level.

SUMMARY OF THE INVENTION

The anti-spill device, according to the invention, for use with a liquid electrolyte battery cell or its opening, comprises a chamber configuration or arrangement associated with a battery cell. The chamber configuration contains electrolyte when a battery is tipped toward or onto any one of its sides and has an inlet in communication with an associated battery cell and an outlet in communication with a vent to atmosphere. The chamber configuration is such that regardless to which side a battery, having said device, is tipped, electrolyte flows from the associated battery cell into the chamber configuration to a level relative to the inlet to cause a stoppage of electrolyte flow from the cell. The chamber configuration is such to ensure that the contained level of electrolyte remains spaced from the outlet of the configuration and thus away from the vent to atmosphere.

The chamber configuration may be in the form of a chamber having its inlet in communication with a respective cell. Each chamber has an outlet off to one side of and below the inlet. Means in the form of a passageway is provided for containing or holding electrolyte and is associated with the chamber outlet. The passageway has its outlet in communication with the vent means. The arrangement is such that the passageway is of sufficient volume to retain the amount of electrolyte which is displaced into it when equilibrium is achieved between levels of electrolyte in the cells and respective passageway. This requires that a portion of the passageway be above the chamber inlet regardless to which side a battery is tipped. The arrangement accomplishes the desired effect of confining electrolyte from the vent when the battery is tipped to any one of its sides.

The chamber configuration may be so arranged, or have its surface sloped, such that when the battery is righted, the contained electrolyte is returned to the respective cell, so as to restore each cell of an electrolyte battery to its normal operating electrolyte level.

BRIEF DESCRIPTION OF THE DRAWINGS

Preferred embodiments of the invention are shown in the drawings, wherein.

DETAILED DESCRIPTION OF THE PREFERRED EMBODIMENTS

Figure 1:
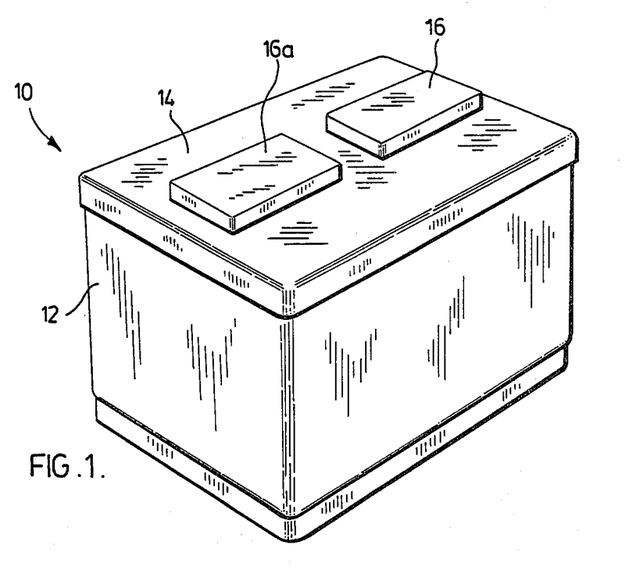
FIG. 1 is a perspective view of a rectangular-shaped liquid electrolyte battery having the anti-spill devices located thereon.

The battery illustrated in FIG. 1 is that commonly referred to as an automotive battery. The battery 10 has a container portion 12 with a lid or cover 14 which is normally heat sealed or glued to the container 12. Normally across the top or cover of the battery 14 a plurality of cell openings are located. As shown, two anti-spill devices 16 and 16a, as formed in gang vent style, are placed on top of the battery to effect anti-spill protection plus venting of the battery cells.

Since the embodiments of the invention are directed to the anti-spill features, it is understood that various types of venting devices may be incorporated in the anti-spill arrangement and thus the venting arrangement is not described in detail.

Figure 2:
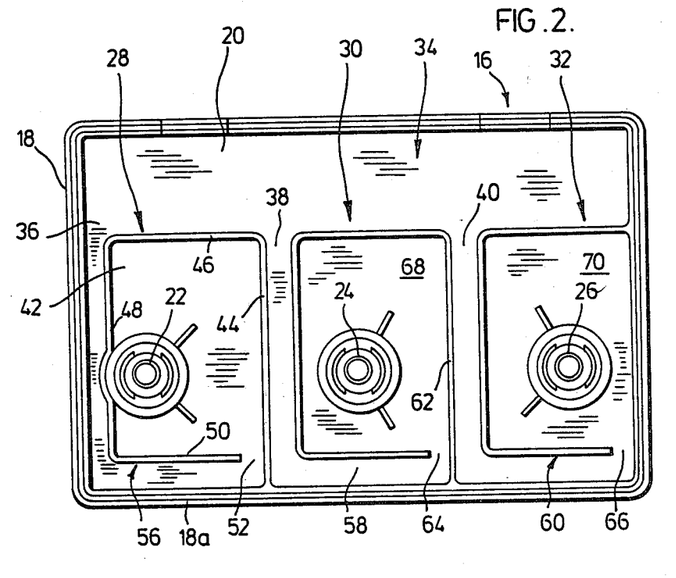
FIG. 2 is a section of an anti-spill device according to this invention.

FIG. 2 is a section through the anti-spill device 16 which is rectangular in shape to correspond with the overall shape of the battery. The anti-spill device 16 has four sidewalls 18, all of which are perpendicular to one another to define the rectangular shape. Internally of the anti-spill device 16, there is a base portion 20 having several compound surfaces which will be described with respect to FIGS. 6 and 7. In the base 20 of the device 16 there is provided three evenly spaced-apart baffle arrangements 22, 24, and 26. Each of the baffle arrangements is part of a plug device for causing electrolyte to condense out of the gases which emanate from the cell and to accomplish a return of such electrolyte to the cell, and thus each baffle arrangement is in communication with each cell. Each baffle arrangement 22 through 26 has openings which will be described in more detail with respect to FIGS. 4 and 5, to provide the inlets for the chamber configurations generally designated 28, 30 and 32 which are in communication with the respective cell via the openings. Each chamber configuration is so arranged to contain electrolyte which flows outwardly of the cell opening, when a battery is tipped to its side, where the electrolyte is contained to a level so as to effectively cover each inlet opening of baffles 22, 24 and 26. In blocking each inlet opening and in view of this opening being the only opening for each cell, an airlock is formed whereby air is no longer permitted to enter the cell and thus electrolyte essentially no longer flows from the cell, unless undue pressure is exerted on the battery sidewalls. The configuration for each chamber is such that regardless to which side the battery is tipped, the contained level of electrolyte, which effectively blocks the inlet once equilibrium of the electrolyte levels is achieved, is always away from the outlet of the chamber configuration and thus confined from the area generally desigated 34 which leads to the venting device of the anti-spill device 16. The outlets for each chamber configuration are generally noted at 36, 38 and 40.

More particularly, each chamber configuration, according to this embodiment, consists of a chamber 42 which, as mentioned, has its inlet in communication with the battery cell. The chamber 42 has sidewalls 44, 46, 48 and 50. The outlet for the chamber 42 is at 52 and is located relative to the arrangement shown in the lower righthand corner of the chamber 42. In this embodiment, the opening 52 is defined by the partition 50 being short of sidewall portion 44. Relative to the sidewalls 18 of the device 16, partition or sidewall portions 48 and 50 define a passageway generally designated 56 which, first of all, is in communication with the outlet 52 and runs parallel to sidewall 18a. From this point, it moves upwardly parallel to partition 48 of the chamber arrangement to its outlet at 36. Thus, the outlet of the passageway 56 is located in an area which, relative to the lower corner 52, is in the upper corner which is diagonally opposite outlet 52.

With this configuration shown in FIG. 2, the chamber configuration is, therefore, such that regardless to which side the battery is tipped, electrolyte level as contained to essentially cover the chamber inlet means never reaches the outlet 36 of the chamber configuration. Alternative arrangements for chamber configurations will be appreciated and will be exemplified, for example, in an alternative embodiment of FIG. 12.

It can be gathered from FIG. 2, a compact arrangement is provided in forming the chamber configurations 28, 30 and 32. The sidewall 44 of configuration 28 provides a partition in forming the passageway 58 for configuration 30. Similarly, with configuration 32, passageway 60 is defined by sidewall 18a and common partition members 62, where the respective outlets 64 and 66 for each chamber 68 and 70 are provided.

Figure 3:
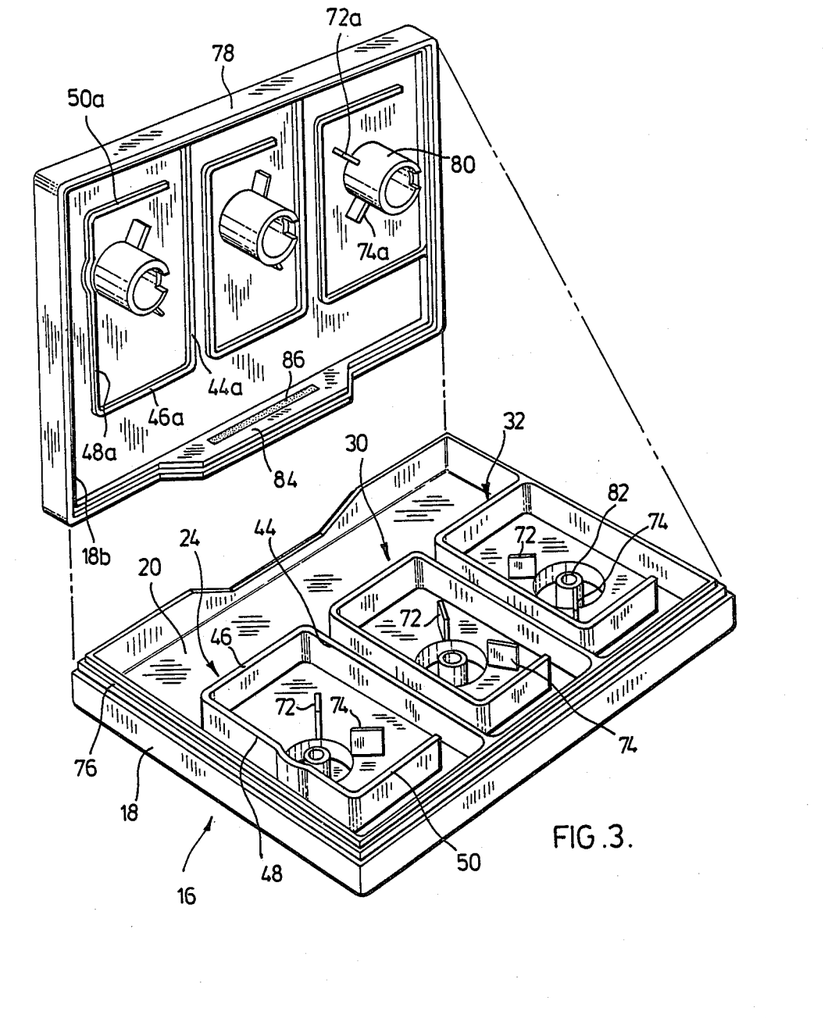
FIG. 3 is an exploded view showing the injection molded components of the anti-spill device which are to be heat sealed together to form a single unit.

Turning to FIG. 3, aspects of the anti-spill device 16 are shown where the device may be formed from an injection molded plastic in two parts which are subsequently heat sealed together to provide a single unit. As illustrated, the device 16 has integrally molded and upstanding from the base 20, partitions 44, 46, 48 and 50 for each chamber configuration to define the chamber outlets and passageways as referred to in FIG. 2. Upstanding from the base portion 20 are in addition fins 72, 74 in each chamber configuration 28, 30 and 32. The sidewalls of the device 16 are stepped at 76 for purposes of heat sealing the bottom component to the upper component 78. The upper component 78 has projecting therefrom outline portions 44a, 46a, 48a and 50a which mate with partition portions 44, 46, 48 and 50 of the base portion of unit 16. Also, upstanding from the upper unit 78 are sleeve portions 80 which overlap the baffle portions 82 in each cell opening baffle arrangement. In addition, upstanding from the upper parts 78 are fins 72a, and 74a which mate with the corresponding fins 72 and 74 in the base portion. At the lower area of the upper portion 78, there is provided a venting arrangement 84 for venting gases which emanate from each cell through the baffle arrangements 82 via passageways 56, 58 and 60 to the common venting area 34. Since as mentioned the particular venting device is not part of the invention, it will not be described in detail; however, as can be appreciated by those skilled in the art, various types of venting devices are available and as illustrated, a particular device may be of the porous ceramic disc type 86, which effects venting of the gases, and acts as a spark arrestor to prevent explosion of the battery should gases be ignited externally of the battery.

The sidewall portions 18b of upper unit 78 are also shaped to mate with the stepped portion 76. To heat seal the units together, they are placed on a platen where the material may be of a thermoplastic, such that when heated to its thermoplastic region, the units are placed together, and the softened plastics joined to form an integral unit. Aside from this approach, the units may also be glued together with an appropriate adhesive to effect a bonding thereof in forming a single unit. Thus it is apparent that, with this particular embodiment of the invention, the anti-spill device is readily formed by use of injection molding techniques where the parts are heat sealed together. In addition due to the particular chamber configuration for the anti-spill feature, a very low profile may be maintained on the battery top to thus lessen the overall height profile of the battery having anti-spill feature compared to the prior art devices.

Figure 4:
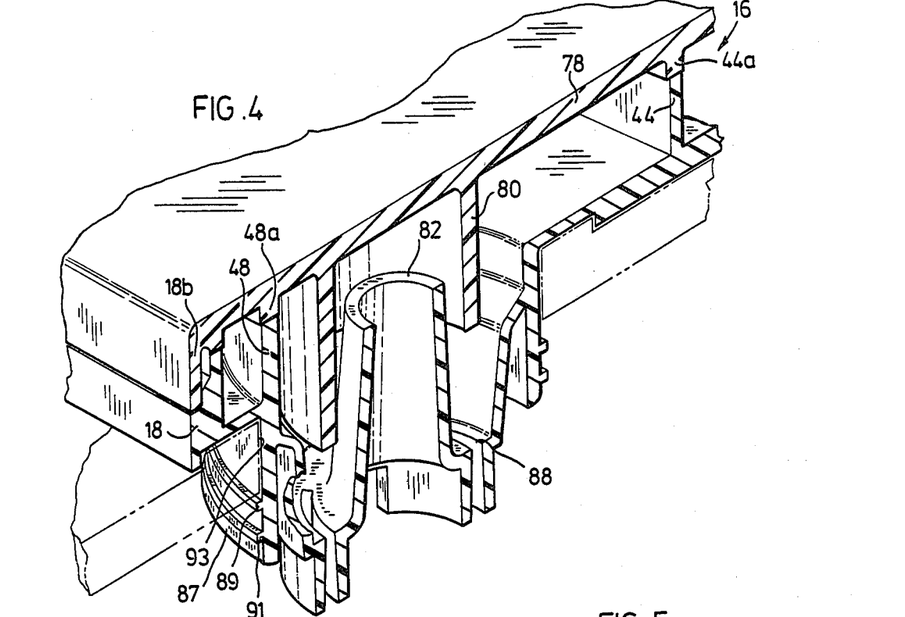
FIG. 4 shows an embodiment of electrolyte return baffle arrangement for a cell opening.
Figure 5:
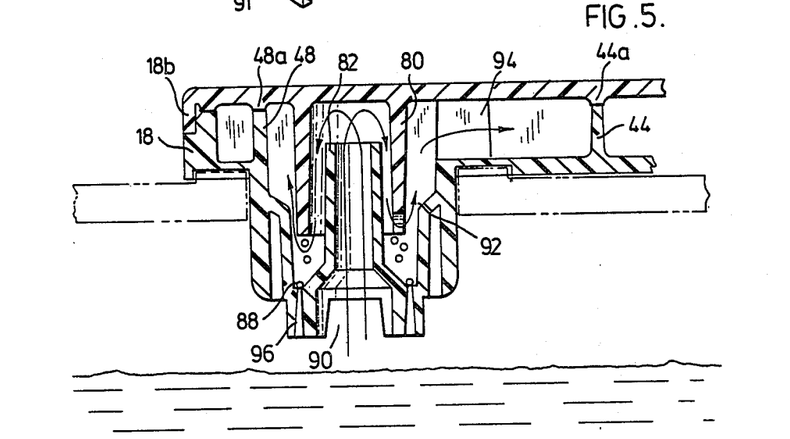
FIG. 5 is the same section as in FIG. 4 showing the unit in association with a battery cell.

Referring more specifically to the baffling arrangements for each cell opening, reference is made to FIGS. 4 and 5. It is appreciated that various types of baffling arrangements may be used and that the embodiment of FIGS. 4 and 5 is only exemplary of various types. FIG. 4 shows the upper part 78 and the base portion of the unit 16 heat sealed together where bonds are formed between partitions 44, 44a, 48 and 48a, and sidewalls 18 and 18b to isolate the chambers and to provide an airtight unit excepting for the chamber inlets and the vent opening. The relationship of the sleeve 80, as it overlaps the baffle arrangement 82, is shown. The baffle arrangement 82 is somewhat chimney shaped and is integrally formed with the base of unit 16. In the lower region of baffle 82, a plurality of openings 88 are provided which provide for return of electrolyte to the battery cell and define the inlet means for the respective chamber of the anti-spill device. Gases emanating from the battery cell normally travel upwardly through baffle 82 and out its upper portion and into the area defined between the sleeve 80 and baffle 82.

The particular gas flow is demonstrated more clearly in FIG. 5, where as shown, the gases travel upwardly through baffle 82 in the direction of arrow 90 and downwardly between the sleeve 80 and baffle 82 and then upwardly in the direction of arrows 92 and 94 into the chamber area 42. The gas then passes through chamber outlet 52 along passageway 56, out of its outlet 36 and into the venting region 34. The surfaces of the baffle arrangement 82 and sleeve 80 and other surrounding surfaces provide areas on which the gases may cool and thus entrained vaporous electrolyte condenses out. The surfaces are all sloped so as to direct condensed electrolyte downwardly to the openings 88, where it is apparent that each opening 88 digresses outwardly, as shown at 96. The purpose of this is to enhance the capillary attraction of droplets which rest on openings 88 and thus draw the liquid downwardly and return it to the corresponding cell.

With respect to tipping of the battery 21 on its sides and preventing of spilling of electrolyte, this will be described in more detail with respect to FIGS. 8 through 11. However, in order to gain a better understanding of the shape of the chamber configuration base portion, reference is made to FIG. 6. The partition portions include sidewall 18, upper portion 46c, side portion 48c and base portion 50c, the outlet to the chamber 70 being provided at 66. The base portion 20 has several compound sloping surfaces. The most elevated part of the base 20 is in the venting area 34. Surface 98 slopes downwardly to surface 100 which again slopes downwardly towards opening or outlet 66, where surfaces 98 and 100 define the base portion of passageway 60. At outlet 66, there is a further downwardly sloping surface 102 which leads to the opening 104 for return of electrolyte via openings 88. Also adjacent surface 102, is the additional surface 106 which again slopes downwardly from wall 46 towards the opening 104 for purposes of returning the electrolyte.

Figures 6, 7:
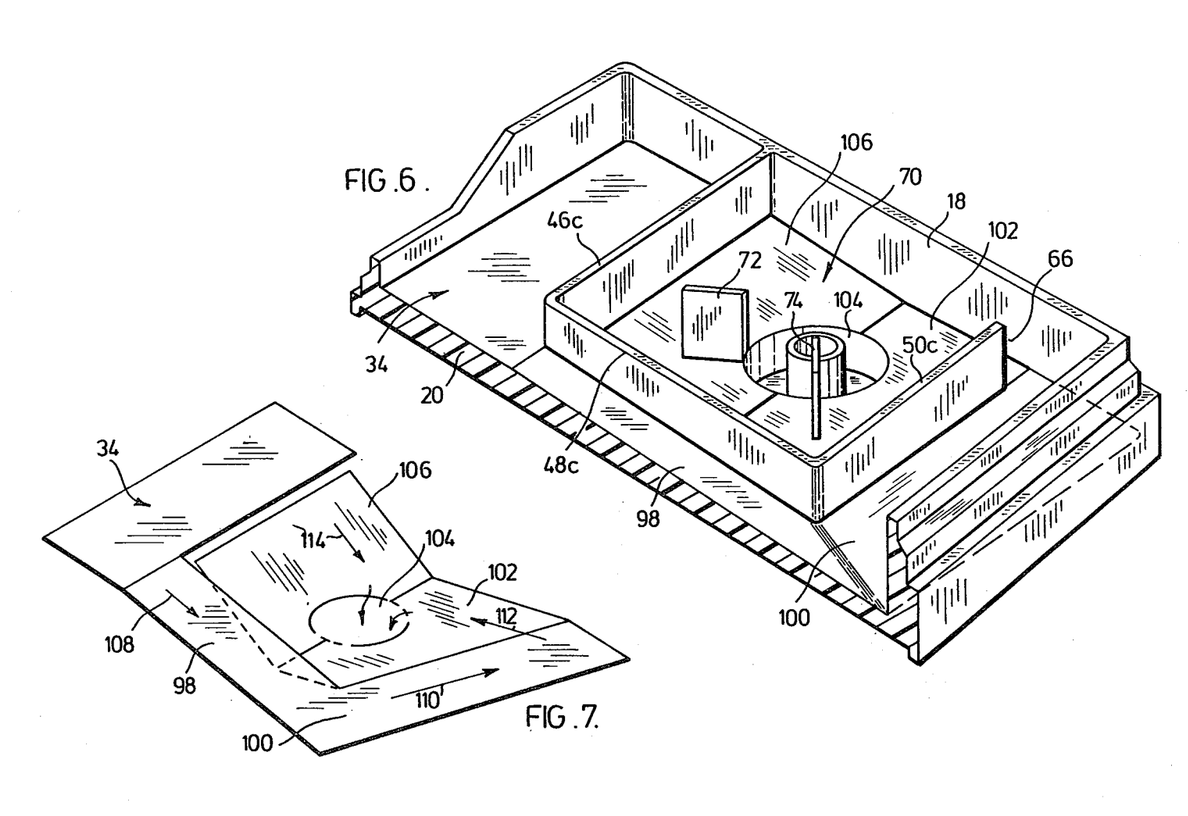
FIG. 6 is a view of a portion of the anti-spill device showing the sloped surfaces to accomplish electrolyte return.
FIG. 7 shows in further detail the compound surfaces which provide electrolyte return for each anti-spill device.

Further illustration of the sloping surfaces are shown in FIG. 7, where it can be seen, according to arrows 108, 110 and 112, the direction of electrolyte travel on surfaces 98, 100 and 102 towards the opening 104. Similarly with any electrolyte lying on the surface 106, it is returned to the opening 104 in the direction of arrow 114. Thus, all surfaces are appropriately sloped to ensure that any electrolyte lying on the chamber configuration base is returned to the opening 104 when a battery is uprighted, or when electrolyte, which finds its way out of the opening 104 by way of battery vibration or condensation.

Figure 8:
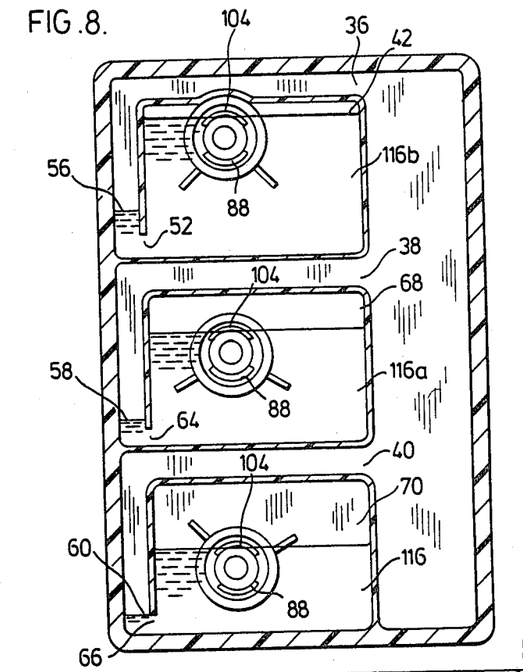
FIGS. 8, 9, 10 and 11 show levels of contained electrolyte in each of the anti-spill chambers for tipping of the battery to each of its four sides.

Turning to FIG. 8, the battery 10 has been tipped to a first side, which would be one of its narrower sides. As shown in FIG. 8, electrolyte flows through each of the openings 104 into the chamber area 70. The electrolyte rises in chamber area 70 to close off its outlet 66. At this point, air cannot enter into chamber 70, thus a closed system is established between the electrolyte in the battery cell and the chamber 70. An exchange of electrolyte continues in flowing from the cell into the chamber through the baffle openings, as electrolyte rises in chamber 70 to effectively block further exchange of air through the vent opening between chamber 70 and the cell.

The extent to which the electrolyte rises in passageway 60 is dependent upon the head of electrolyte from the opening 66 to the level of the electrolyte within the cell. As can be appreciated depending upon the location of the cell opening relative to the cell sidewalls and partitions, determines the head of electrolyte in the cell above its respective chamber opening, such as chamber opening 66. If there is very little head, the electrolyte in passageway 60 does not rise very far. For purposes of illustration and as established by experimentation, FIG. 8 shows various levels of electrolyte in the respective passageways 56, 58 and 60. Obviously with the chamber 70 associated with a battery cell, the electrolyte has hardly risen at all in the passageway 60, which indicates that there is very little head of the electrolyte in the cell above the opening 66. However, with respect to the cells associated with chambers 42 and 68, it can be seen that the heads of those cells are consecutively higher. The difference in the heads from cell to cell may be dependent upon the quantity of electrolyte in each cell and the internal configuration of each cell and the internal pressure within the cell once static equilibrium has been achieved between the level of electrolyte in passageway 60 and the level of electrolyte within the battery cell. The static equilibrium is, of course, established by an equlization of the atmospheric pressure in passageway 60 plus the head of the electrolyte above the opening 66 with the internal pressure in the battery cell plus the head of cell electrolyte above the opening 66. Since the medium is battery acid which has a specific gravity slightly greater than one, the differences in head from cell to cell does not result in a very pronounced difference in levels in the passageways.

Similarly, with chambers 42 and 68, the electrolyte 116a and 116b has raised to the levels shown to close off openings 88 in each chamber and has risen in the respective passageways 56 and 58 to the extent shown for the above reasons. The chamber configuration is such that the electrolyte, which has risen in the passageways 56, 58 and 60, is confined from the respective outlets of the passageways 36, 38 and 40. Thus, no electrolyte from any one of the cells finds its way to the venting region 34, whereby the passageways serve to hold any electrolyte which flows out of the chamber outlets. As can be appreciated by those skilled in the art, flooding of the venting arrangement can be hazardous at times, particularly with sintered disc venting devices, because the electrolyte clogs the pore openings and can result in a hazardous venting conditions.

To accomplish this electrolyte containment with this particular chamber configuration for rectangular-shaped chambers, the opening 66 of each chamber is located in a region diagonally opposite to the opening or outlet for the passageway or the means external of the chamber for holding electrolyte which passes out of the chamber. The lower and upper corners of the venting device 16 are, of course, defined relative to the rectangular battery for the particular side it is lying on.

Figure 9:
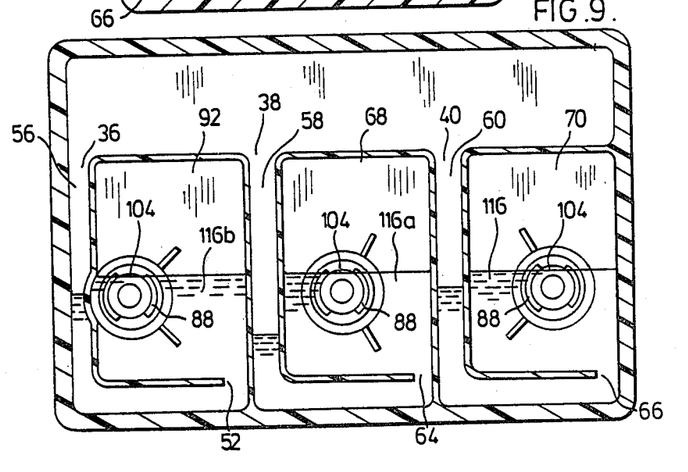

With respect to FIG. 9, the battery is tipped to a second side which is one of its longer sides. In this arrangement, each chamber 42, 68 and 70 contains electrolyte 116, 116a and 116b to the level shown to effectively block or cover the respective opening 104 for preventing additional air from the respective chamber entering the corresponding cell. The electrolyte, as it flows into each chamber 42, 68 and 70, passes out of the openings 52, 64 and 66 into the respective passageways 56, 58 and 60. As with the flow of electrolyte, described with respect to FIG. 8, in FIG. 9 the levels to which the electrolyte rises in passageways 56, 58 and 60 is dependent upon the head of the electrolyte in the respective cell relative to the chamber outlets 52, 64 and 66. It is important to note, however, that with respect to the level of electrolyte in passageway 58, it is lower than the level of electrolyte in passageways 56 and 60. This has been illustrated to demonstrate the aspect that a difference in volume of air in the cells, which may be due to a difference in the cell configuration results in different levels in the passageways. The lower electrolyte level may be the result of there being a lesser volume of air in that respective cell than in the other cells, where even though there is a higher head in that respective cell, the pressure within the cell is resultantly less. Thus the atmospheric pressure on the column of electrolyte in passageway 58 requires a smaller head of electrolyte in 58 to balance the internal pressure of the cell plus the head of the electrolyte within the cell above the opening 64. Again in this embodiment, the electrolyte in each passageway is confined from its respective outlet 36, 38 and 40 and thus kept away from the venting area 34. As a design consideration, it is appreciated that the length of each passageway 56, 58 and 60 must be such to accommodate the required column of electrolyte in the respective passageway which, when static equilibrium is reached, balances the cell internal pressure plus the head of cell electrolyte above the respective chamber outlet.

Figure 10:
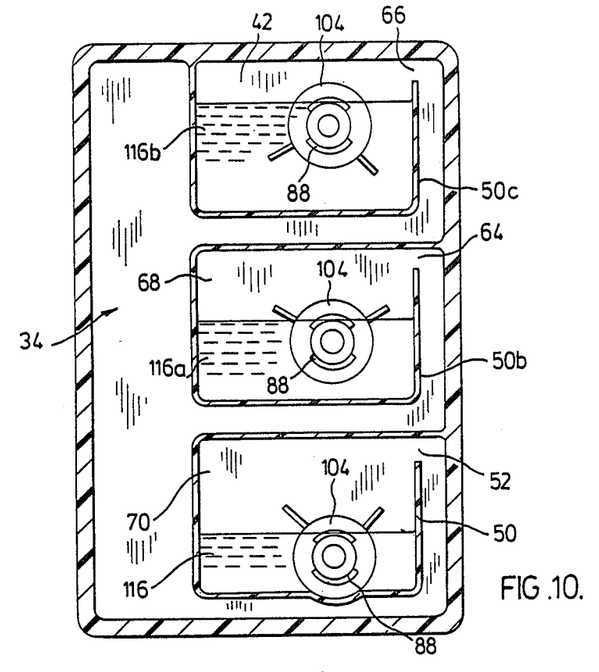

In FIG. 10, the battery has been tipped to one of its shorter sides, namely a third side which is opposite the first side of the battery. For this configuration, the respective chambers 42, 68 and 70 have been filled with electrolyte 116, 116a, and 116b to the levels shown to effectively block the openings 88 from an electrolyte flow and air exchange sense. In view of the upstanding partitions 50, 50b and 50c, the contained electrolyte in each chamber 42, 68 and 70 does not reach the level of the respective chamber outlets 52, 64 and 66. Thus, the respective passageways for each chamber configuration does not hold any electrolyte and thereby the electrolyte is readily kept away from the venting area 34. As with the electrolyte levels of FIGS. 8 and 9, in FIG. 10 once the level of electrolyte covers the baffle openings 88 of the chamber inlet, there will remain a head of electrolyte within the cell above the chamber inlet. Thus equilibrium must be reached within the respective chamber to compensate for this head. Interestingly enough, it has been found that due to the surface tension of the electrolyte, a bubble may form at the upper edge of the top opening of the chamber inlet and result in the electrolyte not completely covering the inlet. The head of electrolyte within the cell is not sufficient to overcome the surface tension of this bubble and thus the levels are shown are achieved to effectively block further exchange of air between chamber and cell.

Figure 11:
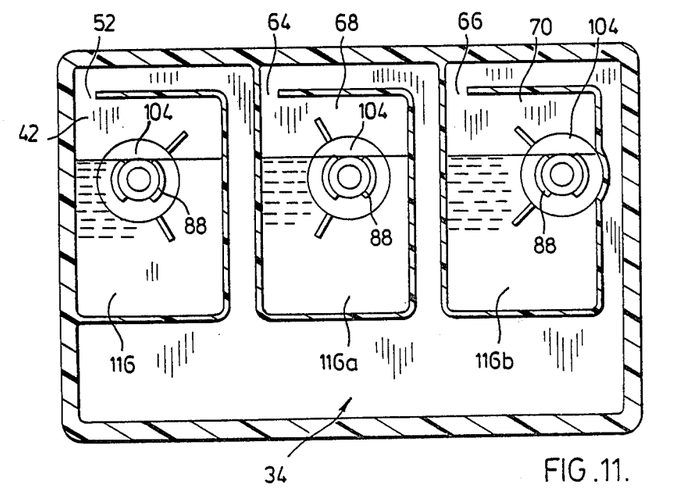

Similarly with FIG. 11, the battery is tipped to its fourth side which is the longer side opposite the second side to again fill each of the chambers 42, 68 and 70 with the contained electrolyte 116, 116a and 116b to the levels shown to block the chamber inlets 88 and thus block further electrolyte flow and air exchange between each cell and respective chamber. Because the level of electrolyte in each chamber is below the level of the respective chamber outlets 52, 64 and 66, none of the electrolyte finds its way to the passageways and thus with this particular circumstance, again electrolyte is confined from the venting area 34.

As previously explained with respect to the embodiment of FIGS. 8 and 9, the extent or height of the passageways 56, 58 and 60 must be designed such to accommodate the anticipated head of electrolyte therein. However in view of the specific gravity of the electrolyte being slightly greater than one and thus requiring little head in the passageways to balance the head plus pressure within the cell, a relatively compact arrangement is provided. Even if the openings for the cells were located along and adjacent one side of the battery, such that when the battery is tipped to the side placing the cell openings lowermost and thus providing a head of electrolyte extending from the lower side of the cell to almost the top of the cell, it has been found that a relatively modest column of electrolyte is required in the passageway in achieving equilibrium.

It can be appreciated with respect to the description of the sloping surfaces of FIGS. 6 and 7, that when the tipped battery is discovered, it can be righted by simply lifting it off its side and placing it on its base to thus cause the electrolyte to flow, as contained in each anti-spill device, back into the respective cell to restore each cell to its normal operating electrolyte level. This is a feature of the anti-spill device, since it assures that, should the battery be tipped several times to any one of its sides, each cell regains the electrolyte it lost while it was tipped and contained in the anti-spill devices.

It should also be mentioned that, with respect to the device 16 which has depending plug portions 89 which form part of the gang vent style, as shown in FIG. 4, the exterior surface 87 of each plug portion 89 may be provided with a plurality of ribs generally designated 91 for purpose of sealing against the sidewall 93 which defines each battery cell opening. These ribs 91 provide an airtight seal for each battery cell to ensure that openings 82 and 88 are the only openings for the particular cell. The ribs also assist in accommodating slight variations in the center to center dimensions for the cell openings, as the gang vent plugs are forced into the openings.

In view of the description of the various preferred embodiments of the invention, it can be appreciated that the anti-spill device may be used on a battery in several different ways. The anti-spill device may be an integral unit for each cell opening; it may be in a gang vent style or it may be integrally molded with the cover to serve all cells of each battery. The arrangement for the chamber configurations, which provides the anti-spill feature, has a very low profile. The anti-spill devices work on the basis of providing a level of electrolyte which covers each cell opening to prevent further flow of electrolyte from the cell by not letting any further air into the cell and thus give the compact arrangement for containing the electrolyte.

Although preferred embodiments of the invention have been described herein in detail, it will be understood by those skilled in the art that variations may be made thereto without departing from the spirit of the invention or the scope of the appended claims.

The embodiments of the invention in which an exclusive property or privilege is claimed are defined as follows:

1. In a liquid electrolyte cell type battery having a plurality of cells, a battery container having defined therein a plurality of cell partitions and a battery cover sealed to said battery container to isolate the cells, said cover having means for venting to atmosphere gasses above the cell electrolyte level generated in each cell and means interposed each cell above its electrolyte level and said vent means for containing electrolyte which rises above an opening into said containment means when a battery is tipped to anyone of its sides, said containment means containing electrolyte to at least a level which causes relative to said opening a blockage of further flow of electrolyte into said containment means by preventing air from the venting means entering the respective cell, said containment means being on one level within said cover and comprising a partition arrangement which defines a chamber having said opening as its inlet and an outlet in communication with said vent means, said partition arrangement defining at least a partially convoluted passageway which allows said level of electrolyte effectively covering said inlet to seek a level in the passageway which, once equilibrium of the electrolyte levels in the cell and passageway are achieved, is spaced along said passageway from said outlet, said containment means thereby confining electrolyte away from said vent means and precluding electrolyte spillage regardless to which side the battery is tipped.

2. In a battery of claim 1, said containment means for each cell being adapted to return confined electrolyte to its associated cell when the battery is righted to restore the cell electrolyte to its operating level.

3. In a battery of claim 1, said inlet being defined in the base of said chamber, said passageway leading from said chamber to said outlet where said passageway and chamber are sloped so as to return electrolyte to said inlet, said passageway being of sufficient width along its length to prevent surface tension of the electrolyte forming blockage of said passageway.

4. An anti-spill device for cells of a liquid electrolyte battery, said anti-spill device comprising a chamber with an inlet in communication with a respective cell, each chamber having an outlet in communication with means for holding liquid electrolyte exterior of said chamber, said chamber being rectangular with its sides parallel to the cover sides, said holding means being a passageway extending from said chamber outlet along the bottom of the chamber and upwardly along the chamber side to at least above the respective chamber inlet.

5. A gang vent device having anti-spill characteristics when used in association with a rectangular-shaped liquid electrolyte battery having a plurality of cells, said gang vent comprising a hollow body portion having a plurality of plugs depending therefrom, each plug being adapted for sealing engagement with a battery cell opening, each plug having opening means for communication with corresponding battery cell, means for venting said hollow body to exterior said device, a chamber in communication with each plug opening means, said chamber being rectangular and said outlet being in a lower corner area of said chamber off to a side of and below said opening means, and means for holding electrolyte in communication with said chamber outlet, said holding means being a passageway extending from said chamber outlet along the lower side of said chamber and up the adjacent side to at least above the plug opening proximate the diagonally opposite corner of said chamber.

6. A gang vent device of claim 5, wherein there are three gang vent plugs, each rectangular chamber being in communication with a respective plug, a partition arrangement defining the three chambers and corresponding passageways, each passageway outlet being in communication with a common channel which leads to said vent means.

7. A gang vent device of claim 5, wherein the lower surfaces of said device when upright are sloped to return all contained electrolyte to the respective cell and thereby restore the cell electrolyte level to its working level when a battery is righted with said device thereon.

8. A gang vent device of claim 5, wherein said hollow body portion is rectangular having a base with depending plug portions, four sidewalls and a top, each rectangular chamber being defined by a partition which extends outwardly from a sidewall which extends along the row of plugs to beyond said plug opening, across parallel to said sidewall beyond said plug opening, inwardly towards and perpendicular to said sidewall to short of said sidewall and across parallel to and spaced from said sidewall towards said first portion of the partition and short thereof to define the outlet for said rectangular chamber, the partition for the adjacent plug defining in combination with the partition for the other plug a passageway extending from said chamber outlet along said sidewall and outwardly beyond the partition to communicate with said vent means and thereby locate the passageway outlet at the corner of said chamber which diagonally opposite the corner where the chamber's outlet is located.

9. A gang vent device of claim 8, wherein said device is injection molded from thermoplastics material in parts which are subsequently heat sealed together to provide the complete device.

10. A gang vent device of claim 8, wherein sealing rings are provided about the periphery of each plug to form an airtight seal with cell opening wall.

* * * * *